United States Patent
Xu et al.

(10) Patent No.: US 12,327,880 B2
(45) Date of Patent: Jun. 10, 2025

(54) BATTERY

(71) Applicant: CALB Co., Ltd., Jiangsu (CN)

(72) Inventors: Jiuling Xu, Changzhou (CN); Yongjie Zhang, Luoyang (CN); Lulu Zhang, Changzhou (CN)

(73) Assignee: CALB Co., Ltd., Jiangsu (CN)

( * ) Notice: Subject to any disclaimer, the term of this patent is extended or adjusted under 35 U.S.C. 154(b) by 540 days.

(21) Appl. No.: 17/903,040

(22) Filed: Sep. 6, 2022

(65) Prior Publication Data
US 2023/0411782 A1    Dec. 21, 2023

(30) Foreign Application Priority Data
Jun. 20, 2022    (CN) .......................... 202210699632.6

(51) Int. Cl.
*H01M 50/383*    (2021.01)
*H01M 50/143*    (2021.01)

(52) U.S. Cl.
CPC ....... *H01M 50/383* (2021.01); *H01M 50/143* (2021.01)

(58) Field of Classification Search
CPC . H01M 50/383; H01M 50/143; H01M 50/538
See application file for complete search history.

(56) References Cited

U.S. PATENT DOCUMENTS

| | | | |
|---|---|---|---|
| 2003/0077505 A1 | 4/2003 | Goda et al. | |
| 2009/0075159 A1* | 3/2009 | Uh | H01M 50/103 |
| | | | 429/53 |
| 2014/0205877 A1 | 7/2014 | Kim | |
| 2021/0399388 A1* | 12/2021 | Cheng | H01M 50/509 |

FOREIGN PATENT DOCUMENTS

| | | |
|---|---|---|
| KR | 20090028242 | 3/2009 |
| KR | 20120095698 | 8/2012 |

OTHER PUBLICATIONS

"Search Report of Europe Counterpart Application", issued on Sep. 15, 2023, p. 1-p. 9.

* cited by examiner

*Primary Examiner* — Kenneth J Douyette
(74) *Attorney, Agent, or Firm* — JCIP GLOBAL INC.

(57) ABSTRACT

A battery includes an explosion-proof valve and a battery casing. The explosion-proof valve is arranged in the battery casing. The explosion-proof valve is arranged on a first surface of the battery casing, the explosion-proof valve includes a fragile portion. The fragile portion protrudes toward a middle region of the first surface. The fragile portion includes a first end point and a second end point, and an area jointly enclosed by a connection line between the first end point and the second end point and the fragile portion between the first end point and the second end point is a. A minimum distance between the first end point and a circumferential edge of the first surface is b. A minimum distance between the second end point and the circumferential edge of the first surface is c.

12 Claims, 4 Drawing Sheets

BATTERY

CROSS-REFERENCE TO RELATED APPLICATION

This application claims the priority benefit of China application no. 202210699632.6, filed on Jun. 20, 2022. The entirety of the above-mentioned patent application is hereby incorporated by reference herein and made a part of this specification.

BACKGROUND

Technical Field

The present disclosure relates to the technical field of batteries, in particular to a battery.

Description of Related Art

In the related art, an explosion-proof valve is generally a sheet-like structure. Further, the explosion-proof valve may be a substantially rectangular structure, and the explosion-proof valve may be directly fixed on the battery casing during use, so as to block the explosion-proof hole. When the internal pressure of the battery casing reaches a certain level, the explosion-proof valve is burst open to realize pressure relief and, thereby ensuring the safety performance of the battery.

However, the explosion-proof valve of the sheet-like structure is prone to the problem of poor explosion-proof performance, or after the explosion-proof valve is burst open, the gas or liquid discharged from the battery may be sprayed to the adjacent battery, and this causes safety problems.

SUMMARY

The present disclosure provides a battery.

The disclosure provides a battery. The battery includes an explosion-proof valve and a battery casing. The explosion-proof valve is arranged on a first surface of the battery casing, the explosion-proof valve includes a fragile portion. The fragile portion may be broken through, and the fragile portion protrudes toward a middle region of the first surface. The fragile portion includes a first end point and a second end point, and an area jointly enclosed by a connection line between the first end point and the second end point and the fragile portion between the first end point and the second end point is a. A minimum distance between the first end point and a circumferential edge of the first surface is b. A minimum distance between the second end point and the circumferential edge of the first surface is c. The following is satisfied: $0.8 \leq b/c \leq 1.2$, $b \leq 20$ mm, and $5$ mm$^3 \leq ab \leq 300$ mm$^3$.

BRIEF DESCRIPTION OF THE DRAWINGS

For a better understanding of the disclosure, reference may be made to exemplary embodiments shown in the following drawings. The components in the drawings are not necessarily to scale and related elements may be omitted, or in some instances proportions may have been exaggerated, so as to emphasize and clearly illustrate the features described herein. In addition, related elements or components can be variously arranged, as known in the art. Further, in the drawings, like reference numerals designate same or like parts throughout the several views.

DESCRIPTION OF THE EMBODIMENTS

Figure 1:
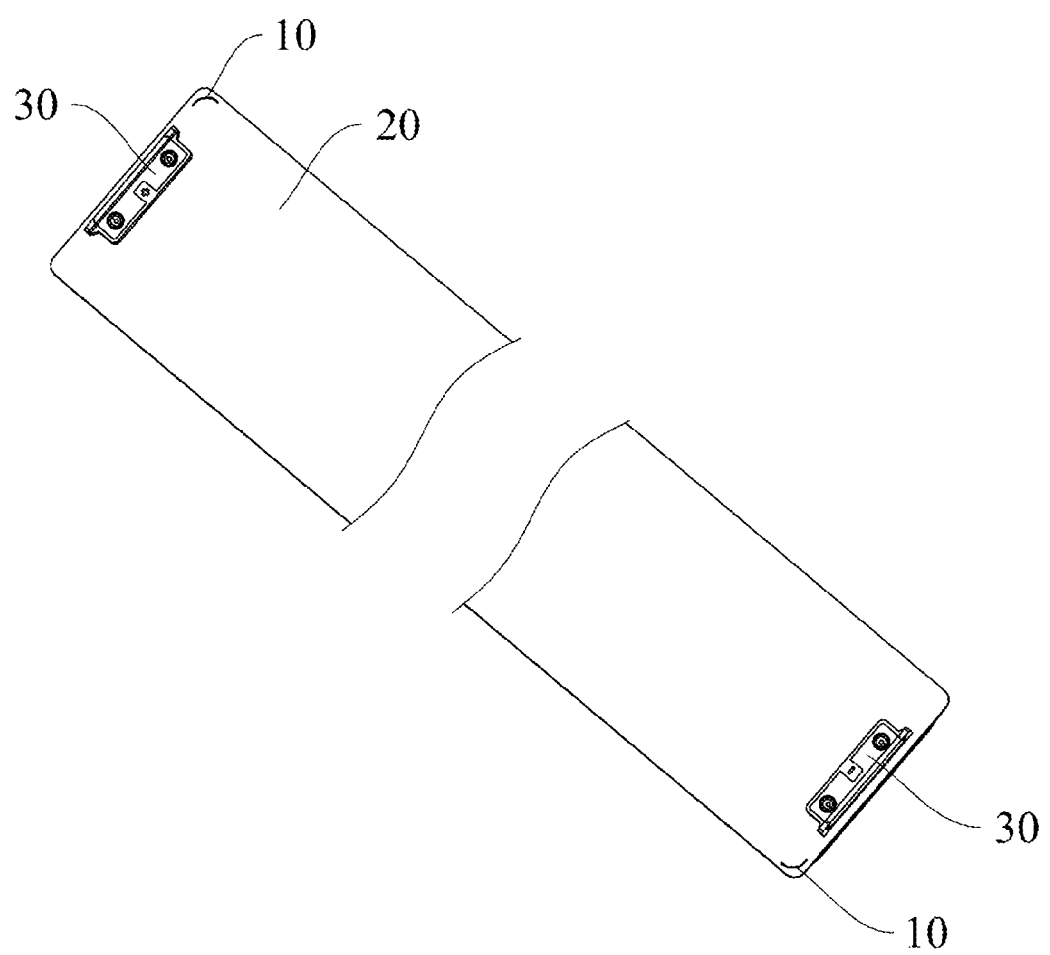
FIG. 1 is a schematic partial structural view of a battery according to an exemplary embodiment.

The technical solutions in the exemplary embodiments of the disclosure will be described clearly and explicitly in conjunction with the drawings in the exemplary embodiments of the disclosure. The description proposed herein is just the exemplary embodiments for the purpose of illustrations only, not intended to limit the scope of the disclosure, so it should be understood that and various modifications and variations could be made thereto without departing from the scope of the disclosure.

In the description of the present disclosure, unless otherwise specifically defined and limited, the terms "first", "second" and the like are only used for illustrative purposes and are not to be construed as expressing or implying a relative importance. The term "plurality" is two or more. The term "and/or" includes any and all combinations of one or more of the associated listed items.

In particular, a reference to "the" object or "a" and "an" object is intended to denote also one of a possible plurality of such objects. Unless otherwise defined or described, the terms "connect", "fix" should be broadly interpreted, for example, the term "connect" can be "fixedly connect", "detachably connect", "integrally connect", "electrically connect" or "signal connect". The term "connect" also can be "directly connect" or "indirectly connect via a medium". For the persons skilled in the art, the specific meanings of the abovementioned terms in the present disclosure can be understood according to the specific situation.

Further, in the description of the present disclosure, it should be understood that spatially relative terms, such as "above", "below" "inside", "outside" and the like, are described based on orientations illustrated in the figures, but are not intended to limit the exemplary embodiments of the present disclosure.

In the context, it should also be understood that when an element or features is provided "outside" or "inside" of another element(s), it can be directly provided "outside" or "inside" of the other element, or be indirectly provided "outside" or "inside" of the another element(s) by an intermediate element.

An embodiment of the present disclosure provides a battery. Please refer to FIG. 1 to FIG. 5, the battery includes an explosion-proof valve 10 and a battery casing 20. The explosion-proof valve 10 is disposed on the first surface 21 of the battery casing 20. The explosion-proof valve 10 includes a fragile portion, and the fragile portion may be broken through. The fragile portion protrudes toward the middle region of the first surface 21, and the fragile portion includes the first end point 113 and the second end point 123. The area jointly enclosed by the connection line between the first end point 113 and the second end point 123 and the fragile portion between the first end point 113 and the second end point 123 is a, the minimum distance between the first end point 113 and the circumferential edge of the first surface 21 is b, and the minimum distance between the second end point 123 and the circumferential edge of the first surface 21 is c. The following is satisfied: $0.8 \leq b/c \leq 1.2$, $b \leq 20$ mm, and 5 mm³$\leq ab \leq 300$ mm³.

The battery in an embodiment of the present disclosure includes an explosion-proof valve 10 and a battery casing 20. The explosion-proof valve 10 is disposed in the battery casing 20, so that when the internal pressure of the battery casing 20 reaches a preset value, the fragile portion of the explosion-proof valve 10 may be broken through to achieve explosion-proof effect. The area jointly enclosed by the connection line between the first end point 113 and the second end point 123 and the fragile portion between the first end point 113 and the second end point 123 is a. The minimum distance between the first end point 113 and the circumferential edge of the first surface 21 is b. The minimum distance between the second end point 123 and the circumferential edge of the first surface 21 is c. By setting the fragile portion to protrude toward the middle region of the first surface 21, and the following equation, $0.8 \leq b/c \leq 1.2$, $b \leq 20$ mm, and 5 mm³$\leq ab \leq 300$ mm³ are satisfied, the explosion-proof valve 10 as a whole is easy to tear and burst, which facilitates the explosion of the explosion-proof valve 10 without the problem of premature explosion. Moreover, the explosion-proof valve 10 that bursts open may form a guide portion to facilitate the timely ejection of gas and liquid, while avoiding gas and liquid from spraying to adjacent batteries, thereby improving the safety and use performance of the battery.

It should be noted that the explosion-proof valve 10 includes a fragile portion, and the fragile portion may be a low-strength location region, so that when the internal pressure of the battery casing 20 reaches a preset value, the fragile portion of the explosion-proof valve 10 may be broken through to achieve explosion-proof effect. The fragile portion may be formed by structural thinning, or the fragile portion may be formed of a material with lower strength.

Figure 5:
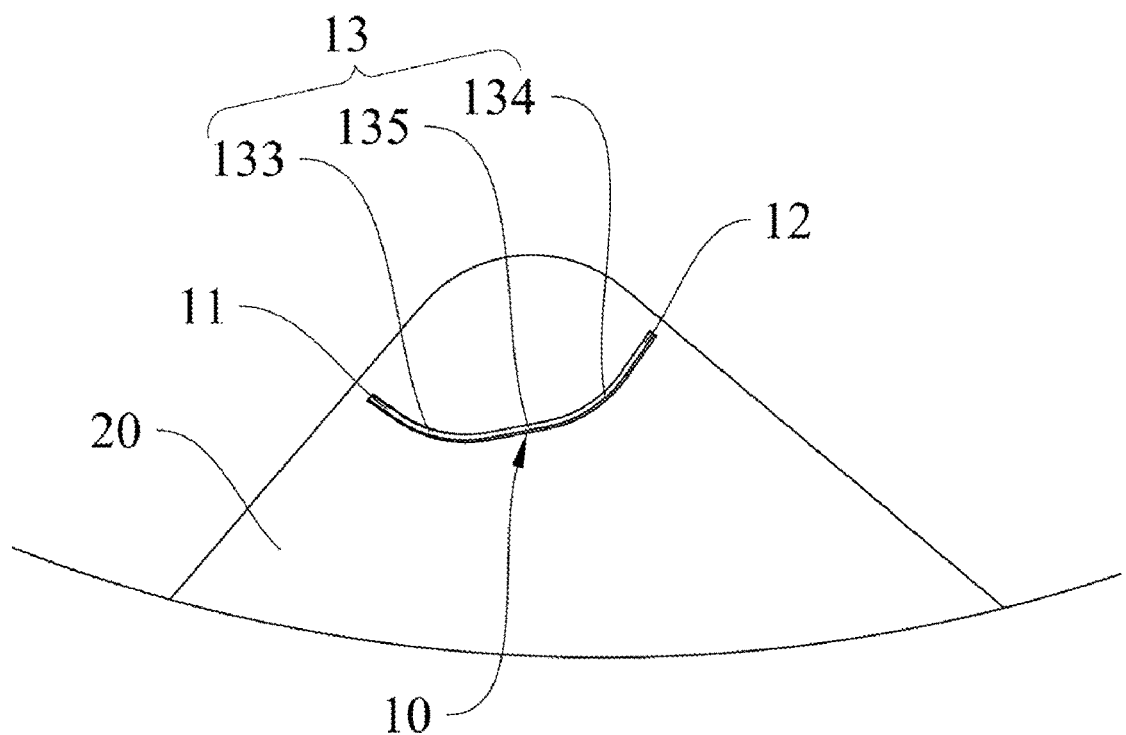
FIG. 5 is a schematic partial structural view of a battery according to another exemplary embodiment.

The fragile portion protrudes toward the middle region of the first surface 21, so that the opening formed by the fragile portion is disposed facing away from the middle region of the first surface 21, so that the opening formed by the fragile portion faces the circumferential edge of the first surface 21 which it is adjacent to. The fragile portion protruding toward the middle region of the first surface 21 does not mean the structural protrusion of the fragile portion, but reflects the extending trend of the fragile portion. For example, the fragile portion may substantially be composed of two intersecting straight line segments. Under the circumstances, the extending trend of the fragile portion may be regarded as that the opening formed by the two intersecting straight line segments extends toward the intersection formed by the two intersecting straight line segments. That is, the extending trend of the fragile portion may be regarded as that the fragile portion protrudes toward the middle region of the first surface 21 from the circumferential edge of the first surface 21 which the fragile portion is adjacent to. Alternatively, the fragile portion may substantially be composed of three straight line segments to form a U-shaped structure, at this time, the extending trend of the fragile portion may be regarded as protrusion which extends from the opening of the U-shaped structure toward the bottom wall of the U-shaped structure, that is, the extending trend of the fragile portion may be regarded as that the fragile portion protrudes toward the middle region of the first surface 21 from the circumferential edge of the first surface 21 which the fragile portion is adjacent to. With reference to FIG. 5 to FIG. 7, the first straight line segment 11, the middle segment 13, and the second straight line segment 12 that form the explosion-proof valve 10 substantially form a bent structure, and the explosion-proof valve 10 as a whole may be regarded as protruding in a direction facing away from the circumferential edge of the first surface 21. That is, the opening formed by the explosion-proof valve 10 is arranged towards the corner region of the circumferential edge.

Figure 4:
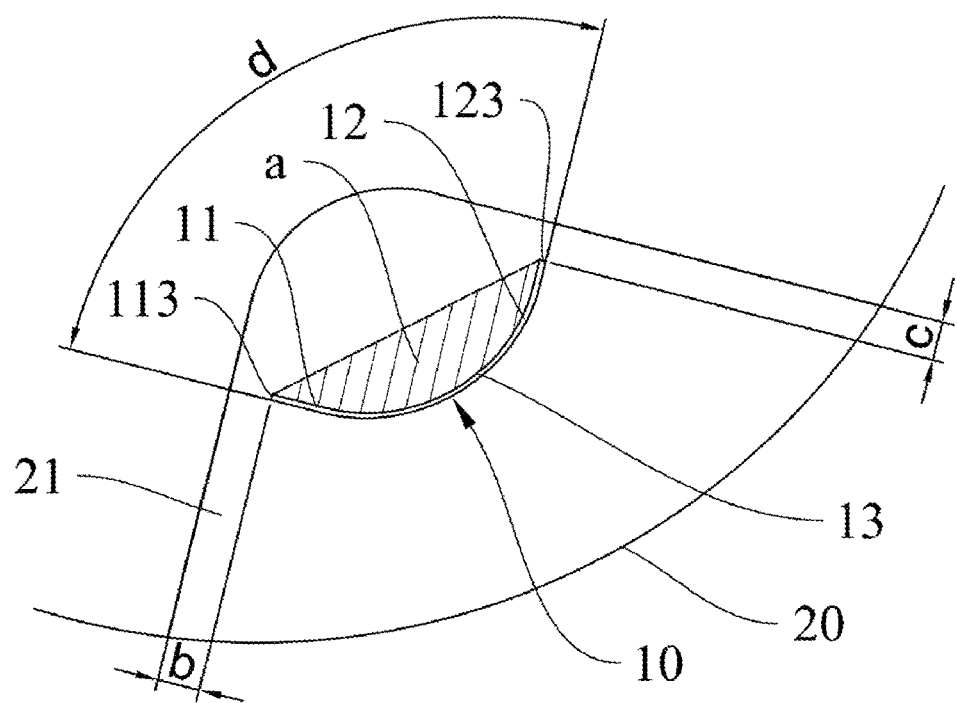
FIG. 4 is a schematic partial structural view of a battery according to an exemplary embodiment.

As shown in FIG. 4, the area jointly enclosed by the connection line between the first end point 113 and the second end point 123 of the fragile portion and the fragile portion between the first end point 113 and the second end point 123 is a. The minimum distance between the first end point 113 and the circumferential edge of the first surface 21 is b. The minimum distance between the second end point 123 and the circumferential edge of the first surface 21 is c. The following equation, $0.8 \leq b/c \leq 1.2$, $b \leq 20$ mm, and 5 mm³$\leq ab \leq 300$ mm³ are satisfied. In this way, the stress distribution at the explosion-proof valve 10 may be effectively controlled, so as to ensure that the explosion-proof valve 10 can burst open when the internal pressure of the battery casing 20 reaches a preset value.

The minimum distance between the first end point 113 and the circumferential edge of the first surface 21 is b, and the minimum distance between the second end point 123 and the circumferential edge of the first surface 21 is c, and $0.8 \leq b/c \leq 1.2$ is satisfied. In this manner, the distance between the first end point 113 and the circumferential edge of the first surface 21 and the distance between the second end point 123 and the circumferential edge of the first surface 21 are substantially the same, which ensures that the fragile portion may be burst open under a specific pressure and avoids excessive length difference, so that it will not be difficult for the explosion-proof valve 10 to burst open. The setting of $b \leq 20$ mm and $c \leq 20$ mm allow the distances between the first end point 113 and the second end point 123 of the fragile portion and the circumferential edge of the first surface 21 to be relatively close, such that it is easy for the fragile portion to tear and burst as a whole, thereby facilitating the fragile portion to explode in time under a certain pressure. The fragile portion is arranged to protrude toward the middle region of the first surface. After the explosion-proof valve 10 bursts open, a spray direction toward the middle region facing away from the first surface 21 may be formed, that is, the explosion-proof valve 10 may form a guide portion, and the lead-out direction of the guide portion is toward the outer edge of the first surface 21, which not only facilitates the timely ejection of gas and liquid, but also avoids gas and liquid from spraying to adjacent batteries. When the batteries are grouped, the first surfaces 21 of two adjacent batteries may be disposed opposite to each other.

The area jointly enclosed by the connection line between the first end point 113 and the second end point 123 and the fragile portion is a, and the equation of $b \leq 20$ mm and 5 mm³$\leq ab \leq 300$ mm³ are satisfied, so that the magnitude of the stress concentration may be effectively controlled, and the premature explosion of the explosion-proof valve 10 may be prevented. In this way, it is possible to ensure that the explosion-proof valve 10 is burst open when the internal pressure of the battery casing 20 reaches a preset value, thereby releasing the internal pressure of the battery casing 20 and ensuring the safety performance of the battery.

The area jointly enclosed by the connection line between the first end point 113 and the second end point 123 and the fragile portion is relatively large, which makes it easy for the fragile portion to explode. Therefore, the distance from the first end point 113 and the second end point 123 to the circumferential edge of the first surface 21 may be set farther. The area jointly enclosed by the connection line between the first end point 113 and the second end point 123 and the fragile portion is relatively small, and a greater explosion pressure is required for bursting the fragile portion open. Therefore, the distance from the first end point 113 and the second end point 123 to the circumferential edge of the first surface 21 may be smaller to facilitate the rapid opening of the explosion-proof valve 10.

The area jointly enclosed by the connection line between the first end point 113 and the second end point 123 and the fragile portion between the first end point 113 and the second end point 123 is a. With reference to FIG. 4, the connection line between the first end point 113 and the second end point 123 is the straight line shown in the figure, and the fragile portion between the first end point 113 and the second end point 123 may be the connection line formed by the first straight line segment 11, the second straight line segment 12 and the middle segment 13 toward the inner wall surface of the connection line between the first end point 113 and the second end point 123. The area enclosed between the straight line and the connection line is a.

In an embodiment, the equation of $0.9 \leq b/c \leq 1.1$, and/or $b \leq 15$ mm are satisfied, and such settings ensure that the explosion-proof valve 10 is cantilevered symmetrically and easy to achieve stress concentration, and the fragile portion may be exploded under a specific pressure, thereby avoiding excessive length difference, so that it will not be difficult for the explosion-proof valve 10 to burst open.

In an embodiment, the equation of $20 \text{ mm}^3 \leq ab \leq 100 \text{ mm}^3$ is satisfied, and such setting allows the magnitude of the stress concentration to be effectively controlled, and premature explosion of the explosion-proof valve 10 may be prevented, so as to ensure that the explosion-proof valve 10 may burst open when the internal pressure of the battery casing 20 reaches a preset value. In this way, the internal pressure of the battery casing 20 is released, so as to ensure the safety performance of the battery.

In an embodiment, the ratio between the minimum distance b between the first end point 113 and the circumferential edge of the first surface 21 and the minimum distance c between the second end point 123 and the circumferential edge of the first surface 21 may be 0.8, 0.85, 0.9, 0.95, 0.98, 1, 1.05, 1.1, 1.15, or 1.2, etc.

In an embodiment, the product of the area a jointly enclosed by the connection line between the first end point 113 and the second end point 123 and the fragile portion between the first end point 113 and the second end point 123 and the minimum distance b between the first end point 113 and the circumferential edge of the first surface 21 may be 5 mm$^3$, 8 mm$^3$, 10 mm$^3$, 15 mm$^3$, 18 mm$^3$, 20 mm$^3$, 22 mm$^3$, 25 mm$^3$, 30 mm$^3$, 40 mm$^3$, 45 mm$^3$, 50 mm$^3$, 60 mm$^3$, 70 mm$^3$, 80 mm$^3$, 90 mm$^3$, 100 mm$^3$, 125 mm$^3$, 130 mm$^3$, 140 mm$^3$, 150 mm$^3$, 160 mm$^3$, 170 mm$^3$, 180 mm$^3$, 190 mm$^3$, 195 mm$^3$, 200 mm$^3$, 205 mm$^3$, 210 mm$^3$, 220 mm$^3$, 250 mm$^3$, 260 mm$^3$, 270 mm$^3$, 280 mm$^3$, 290 mm$^3$, 300 mm$^3$, or 395 mm$^3$ etc.

In an embodiment, the fragile portion includes a first straight line segment 11, a second straight line segment 12 and a middle segment 13. Two ends of the middle segment 13 are respectively connected to the first straight line segment 11 and the second straight line segment 12. One end of the first straight line segment 11 away from the middle segment 13 is the first end point 113, and one end of the second straight line segment 12 away from the middle segment 13 is the second end point 123. By setting the explosion-proof valve 10 as the first straight line segment 11, the second straight line segment 12 and the middle segment 13, the two ends of the middle segment 13 are respectively connected to the first straight line segment 11 and the second straight line segment 12, so as to ensure that at least one of the first straight line segment 11, the second straight line segment 12, and the middle segment 13 may be broken through when the internal pressure of the battery casing 20 reaches a preset value. In this way, it is possible to achieve a reliable explosion-proof effect, thereby improving the safety performance of the battery, while preventing the pressure of the entire explosion-proof valve 10 from being too concentrated and causing premature explosion of the explosion-proof valve 10, which in turn affects the normal use of the battery.

In an embodiment, the length of the first straight line segment 11 and the length of the second straight line segment 12 are substantially the same, so that the middle segment 13 in the middle and the first straight line segment 11 and the second straight line segment 12 between the two ends form a symmetrical structure. The stress applied to the middle segment 13 is uniform, so that the middle segment 13 may burst open under a specific pressure.

In an embodiment, the length of the first straight line segment 11 and the length of the second straight line segment 12 are controlled between 1 mm and 45 mm, which not only ensures that stress concentration is easily achieved in the first straight line segment 11 and the second straight line segment 12, but also it may be ensured that the first straight line segment 11 and the second straight line segment 12 may burst open under the preset pressure.

In an embodiment, there may be an included angle between the first straight line segment 11 and the second straight line segment 12, so as to achieve stress concentration while avoiding excessive and uncontrollable stress, and to ensure that the explosion-proof valve 10 bursts open when the internal pressure of the battery casing 20 reaches a preset value, thereby releasing the internal pressure of the battery casing 20 and ensuring the safety performance of the battery.

In an embodiment, the included angle between the first straight line segment 11 and the second straight line segment 12 may be controlled between 46° to 134°.

In an embodiment, the middle segment 13 includes a curved segment, so that stress concentration may be reduced, so as to ensure that the explosion pressure of the explosion-proof valve 10 is controllable, and the problem of unexpected explosion will not occur. The curved segments may be circular arc segments, or the curved segments may be non-circular arc segments.

In an embodiment, the first straight line segment 11 is connected to the curved segment, and/or the second straight line segment 12 is connected to the curved segment, so as to avoid stress concentration at the connection point between the first straight line segment 11 and the middle segment 13, and avoid stress concentration at the connection point between the second straight line segment 12 and the middle segment 13. In this way, the burst pressure of the explosion-proof valve 10 may be effectively controlled, thereby improving the safety performance of the battery.

In an embodiment, as shown in FIG. 4, the middle segment 13 is a circular arc segment, which can not only avoid stress concentration at the connection point between the first straight line segment 11 and the middle segment 13, but also avoid stress concentration at the connection point between the second straight line segment 12 and the middle segment 13. In this way, the stress may be evenly distributed, so that the burst pressure of the explosion-proof valve 10 may be controlled.

In an embodiment, the widths of the first straight line segment 11, the second straight line segment 12 and the middle segment 13 may be substantially the same, and the widths of the first straight line segment 11, the second straight line segment 12 and the middle segment 13 may be controlled between 0.1 mm and 1 mm.

Figure 2:
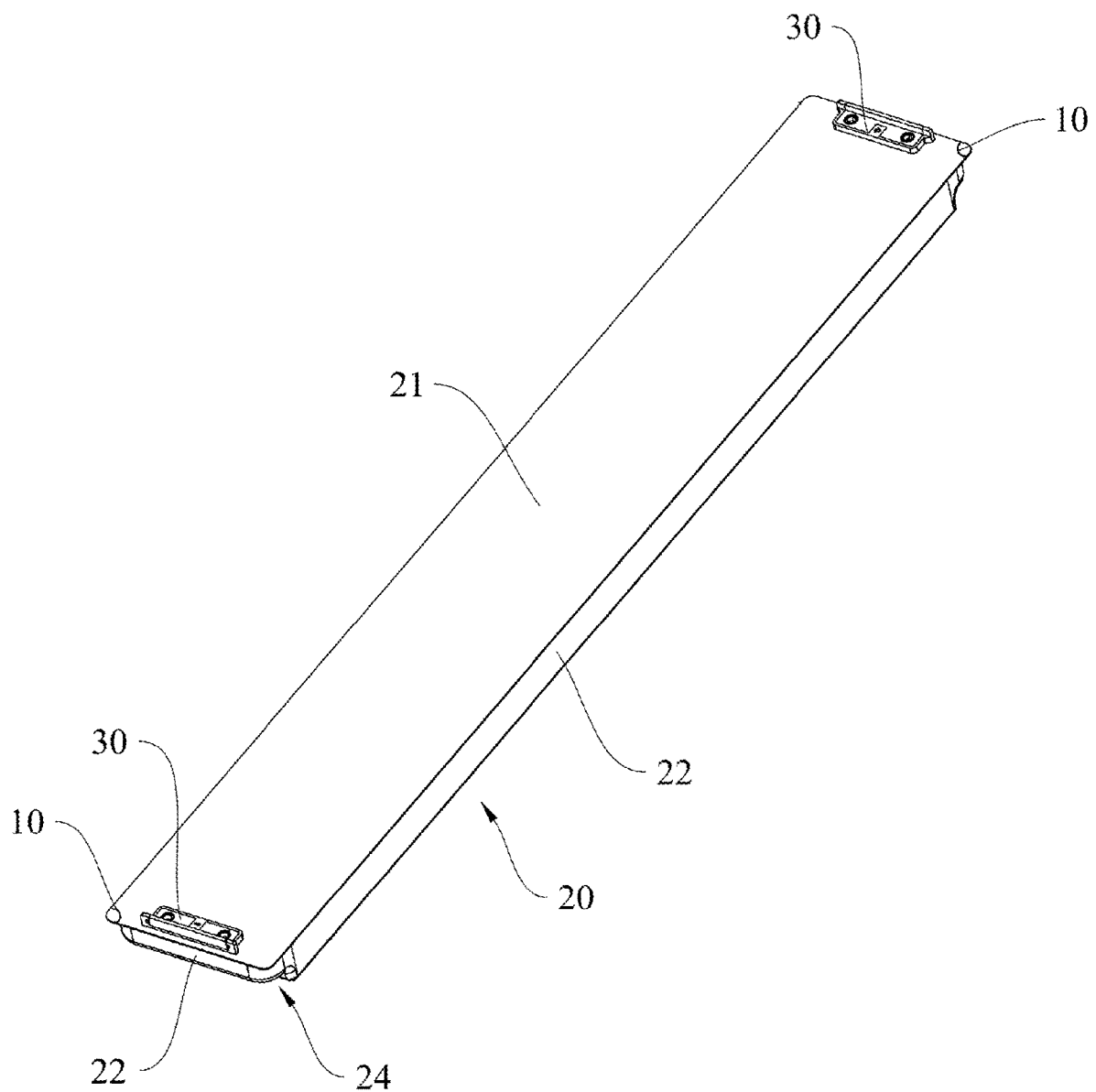
FIG. 2 is a schematic structural view of a battery from a first perspective according to an exemplary embodiment.
Figure 3:
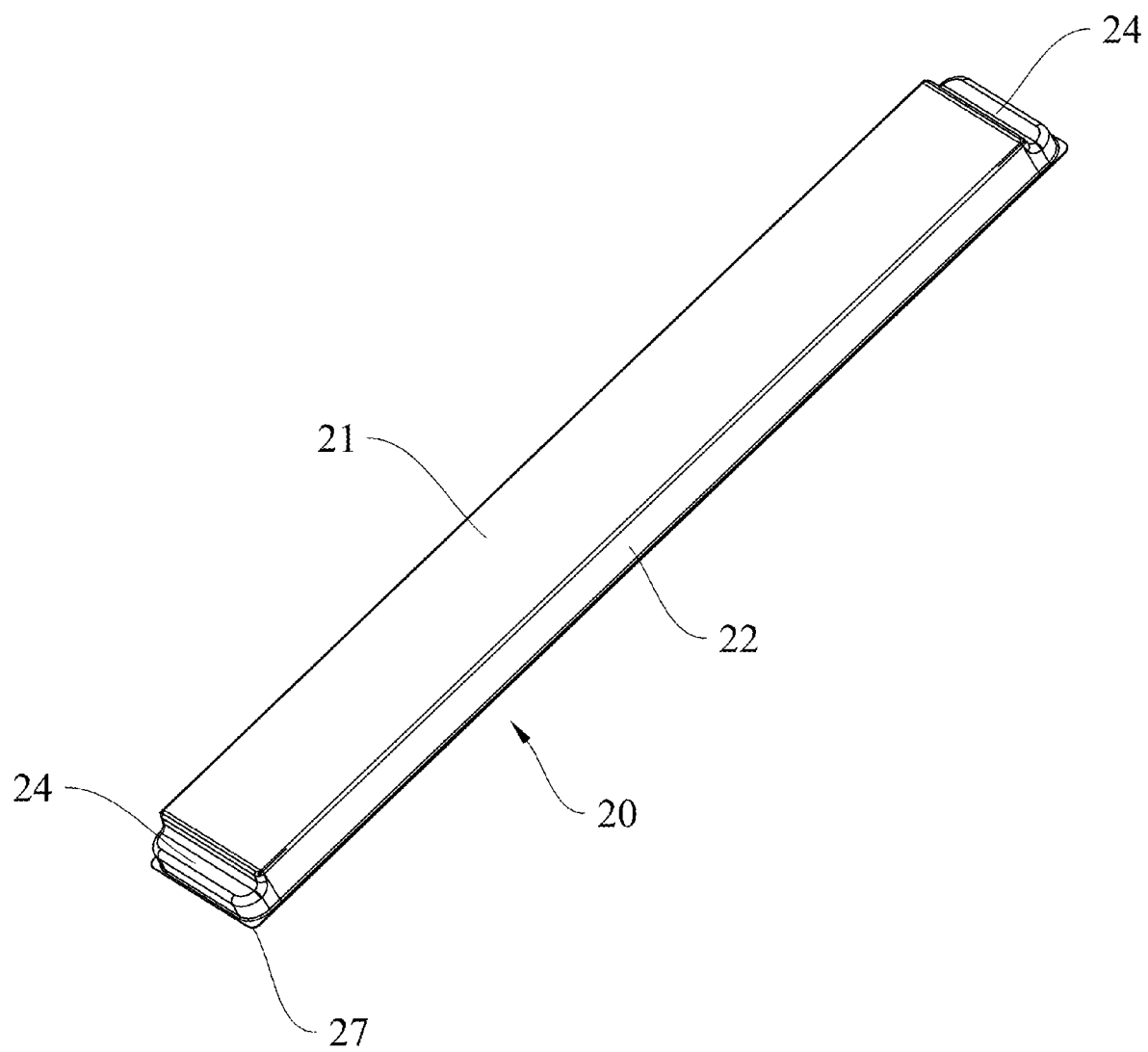
FIG. 3 is a schematic structural view of a battery from a second perspective according to an exemplary embodiment.

In an embodiment, as shown in FIG. 2 and FIG. 3, the battery casing 20 includes two opposite first surfaces 21 and four second surfaces 22 arranged around the first surfaces 21. The area of the first surface 21 is larger than the area of the second surface 22. The explosion-proof valve 10 is disposed on the first surface 21, so that the first surface 21 may provide a reliable support surface for the explosion-proof valve 10, and may facilitate the configuration of the explosion-proof valve 10, thereby improving the safety protection performance of the explosion-proof valve 10.

It should be noted that the battery casing 20 may be a square housing, the two opposite first surfaces 21 are large surfaces of the battery casing 20, and the four second surfaces 22 are small surfaces of the battery casing 20. The four second surfaces 22 include two small surfaces, that is, the first pair of small surfaces extending along the length direction of the battery casing 20, and the second pair of small surfaces extending along the width direction of the battery casing 20. Moreover, the area of the first pair of small surfaces should be larger than that of the second pair of small surfaces, but smaller than the area of the large surfaces.

In an embodiment, the explosion-proof valve 10 is disposed in the corner area of the first surface 21, which can not only reasonably arrange the configuration position of the explosion-proof valve 10, but also prevent the gas or liquid in the battery casing 20 from spraying toward adjacent batteries after the explosion-proof valve 10 bursts open, so that the adjacent batteries will not be affected.

At least a part of the middle segment 13 is disposed in the manner of protruding toward the middle region of the first surface 21, that is, at least a part of the middle segment 13 is disposed facing away from the circumferential edge of the first surface 21, so as to control the distance between the middle segment 13 and the circular arc transition segment, so as to control the explosion pressure of the explosion-proof valve 10.

In an embodiment, the minimum vertical distance between the explosion-proof valve 10 and the second surface 22 adjacent thereto is less than 10 mm, so that the explosion-proof valve 10 may be as close to the edge of the battery casing 20 as possible. In this way, it may be avoided as much as possible that after the explosion-proof valve 10 bursts open, the gas and liquid in the battery casing 20 are sprayed toward the adjacent batteries, so as to improve the safety performance of the battery.

The corner region of the first surface 21 may be regarded as the location region where both ends of the diagonal line of the first surface 21 are located. The first surface 21 may be substantially a rectangular surface. Under the circumstances, the first surface 21 may have four corner regions.

The minimum vertical distance between the explosion-proof valve 10 and the second surface 22 adjacent thereto is less than 10 mm, that is, the minimum distance between one side of the explosion-proof valve 10 close to the second surface 22 and the second surface 22 needs to be less than 10 mm. In this way, it is possible for the explosion-proof valve 10 to be as close as possible to the circumferential outer edge of the battery casing 20, that is, the explosion-proof valve 10 may be as close as possible to the second surface 22, so as to reasonably arrange the setting position of the explosion-proof valve 10. Accordingly, it is possible to reduce the probability that the gas and liquid in the battery casing 20 will be sprayed toward the adjacent batteries after the explosion-proof valve 10 bursts open.

In an embodiment, there is a circular arc transition segment between two adjacent second surfaces 22, and the minimum vertical distance between the first straight line segment 11 and a second surface 22 is less than 10 mm, that is, the minimum vertical distance between the first end point 113 and one second surface 22 is less than 10 mm. The minimum vertical distance between the second straight line segment 12 and the other second surface 22 is less than 10 mm, that is, the minimum vertical distance between the second end point 123 and the other second surface 22 is less than 10 mm, and the minimum vertical distance between the middle segment 13 and the circular arc transition segment is less than 20 mm. In this way, the explosion-proof valve 10 may be as close as possible to the circumferential outer edge of the battery casing 20, which can not only improve the space utilization of the battery casing 20, but also it is possible to reduce the probability that the gas and liquid in the battery casing 20 are sprayed toward the adjacent batteries after the explosion-proof valve 10 bursts open.

It should be noted that, as shown in FIG. 3, the battery casing 20 may have a flange structure 27. The flange structure 27 is arranged around the circumferential outer surface of the battery casing 20, and the flange structure 27 may be formed by connecting two separate housing members, thereby improving the connection stability of the two housing members. The battery casing 20 includes two opposing first surfaces 21 and four second surfaces 22 disposed around the first surfaces 21. Here, the first surfaces 21 and the second surfaces 22 may not include the surfaces formed by the flange structure 27, thereby ensuring that the gas inside the battery casing 20 is in contact with the explosion-proof valve 10, and ensuring that the explosion-proof valve 10 may be broken through when the internal pressure of the battery casing 20 reaches a preset value.

Regarding the minimum vertical distance between the first end point 113 and one second surface 22 being less than 10 mm, the minimum vertical distance between the second end point 123 and the other second surface 22 being less than 10 mm, the minimum vertical distance between the middle segment 13 and the circular arc transition segment being less than 20 mm, it may be considered that after the flange structure 27 of the battery casing 20 is completely removed, the minimum distance between the first end point 113 and the circumferential edge of the first surface 21 is less than 10 mm, the minimum distance between the second end point 123 and the circumferential edge of the first surface 21 is less than 10 mm, and the minimum distance between the middle segment 13 and the circumferential edge of the first surface 21 is less than 20 mm.

It should be noted that when the battery casing 20 may have the flange structure 27, the minimum distance between the first end point 113 and the circumferential edge of the first surface 21 is greater than the minimum vertical distance between the first end point 113 and one second surface 22, and the minimum distance between the second end point 123 and the circumferential edge of the first surface 21 is greater than the minimum vertical distance between the second end point 123 and the other second surface 22.

In an embodiment, as shown in FIG. 4 and FIG. 5, at least a part of the middle segment 13 protrudes away from the circular arc transition segment adjacent thereto, that is, the at least a part of the middle segment 13 is arranged in the manner of facing away from the circumferential edge of the first surface 21, so as to control the distance between the middle segment 13 and the circular arc transition segment and to control the explosion pressure of the explosion-proof valve 10.

It should be noted that, at least a part of the middle segment 13 protrudes toward a certain position, or at least a part of the middle segment 13 protrudes in the manner of facing away from a certain position, which mainly reflects the tendency of the middle segment 13. For example, taking at least a part of the middle segment 13 protruding toward the middle region of the first surface 21 as an example, as shown in FIG. 4 and FIG. 5, the first straight line segment 11, the middle segment 13, and the second straight line segment 12 constituting the explosion-proof valve 10 substantially form a bent structure, and the explosion-proof valve 10 as a whole may be regarded as protruding in the manner of facing away from the circumferential edge of the first surface 21. That is, the opening formed by the explosion-proof valve 10 is disposed toward the corner region of the circumferential edge.

In an embodiment, the battery casing 20 includes two opposite first surfaces 21 and four second surfaces 22 arranged around the first surfaces 21. The explosion-proof valve 10 is arranged in the corner region of the first surface 21. The first straight line segment 11 and the second straight line segment 12 are respectively perpendicular to the two adjacent second surfaces 22. Further, the first straight line segment 11 is substantially perpendicular to the second surface 22 adjacent thereto, and the second straight line segment 12 is substantially perpendicular to the second surface 22 adjacent thereto, so that the distance between the end portion of the first straight line segment 11 and one second surface 22 is relatively close, and the distance between the end portion of the second straight line segment 12 and the other second surface 22 is relatively close. In this manner, the explosion-proof valve 10 may be easily burst open, thereby improving the safety performance of the battery.

It should be noted that the terms "basic" and "substantially" used in the embodiments refer to the results obtained under the conditions of taking processing errors, configuration errors, etc. into consideration. For example, the first straight line segment 11 is substantially perpendicular to the second surface 22 adjacent thereto, and the second straight line segment 12 is substantially perpendicular to the second surface 22 adjacent thereto. When processing errors, configuration errors, etc. are ignored, it may be regarded that the first straight line segment 11 is perpendicular to the second surface 22 adjacent thereto, and the second straight line segment 12 is perpendicular to the second surface 22 adjacent thereto.

In some embodiments, it is not excluded that there is a certain included angle formed between the first straight line segment 11 and the second surface 22 adjacent thereto. For example, the range of the included angle between the first straight line segment 11 and the second surface 22 adjacent thereto is 60° to 90°. There is a certain included angle formed between the second straight line segment 12 and the second surface 22 adjacent thereto. For example, the range of the included angle between the second straight line segment 12 and the second surface 22 adjacent thereto is 60° to 90°.

In an embodiment, the explosion-proof valve 10 and the battery casing 20 may be provided separately, that is, the battery casing 20 may be provided with an explosion-proof hole, and the explosion-proof valve 10 is connected to the battery casing 20, so as to realize the blocking of the explosion-proof hole. Under the circumstances, the explosion-proof valve 10 may include a first straight line segment 11, a second straight line segment 12 and a middle segment 13, so that the first straight line segment 11, the second straight line segment 12 and the middle segment 13 may be used as fragile portion of the explosion-proof valve 10. In this way, the fragile portion bursts open to release pressure when the internal pressure in the battery casing 20 reaches a preset value.

In an embodiment, the explosion-proof valve 10 and at least a part of the battery casing 20 are an integrally-formed structure, which not only has a simple structure, but also can reduce the manufacturing process, thereby improving the molding efficiency of the explosion-proof valve 10.

The explosion-proof valve 10 and at least a part of the battery casing 20 are an integrally-formed structure. For example, a part of the battery casing 20 may be thinned to form the explosion-proof valve 10. Alternatively, during the molding process, the battery casing 20 may be partially thinned to serve as the explosion-proof valve 10, so as to realize the pressure release function, such that the process is relatively simple, and that the molding efficiency of the explosion-proof valve 10 may be improved.

It should be noted that the explosion-proof valve 10 may include a fragile portion, and the fragile portion may be composed of the first straight line segment 11, the second straight line segment 12 and the middle segment 13, so that the explosion-proof valve 10 may burst open basically through the first straight line segment 11, the second straight line segment 12, and the middle segment 13, so as to meet the requirements set for explosion-proof and to achieve the pressure release effect.

In an embodiment, the explosion-proof valve 10 is provided with a mark to form a fragile portion, and the mark may include a first mark, a second mark and a third mark, so that the explosion-proof valve 10 is formed with a first straight line segment 11, the second straight line segment 12 and the middle segment 13, that is, the explosion-proof valve 10 is provided with a first mark, a second mark and a third mark. In this way, the explosion-proof valve 10 is thinned to form a fragile portion, so as to meet the requirement set for explosion-proof and to achieve the pressure release effect.

The explosion-proof valve 10 and the battery casing 20 may be provided separately, that is, the first mark, the second mark and the third mark are formed on the explosion-proof valve 10, and the fragile portion of the explosion-proof valve 10 may be formed by the first straight line segment 11, the second straight line segment 12, and the middle segment 13.

The explosion-proof valve 10 and at least a part of the battery casing 20 may be an integrally-formed structure, that is, the first mark, the second mark, and the third mark are formed on the battery casing 20. By forming the first mark, the second mark and the third mark on the battery casing 20, it is possible to thin the battery casing 20 to form a fragile portion, so as to meet the requirements set for explosion-proof and thus achieve the pressure release effect. The fragile portion of the explosion-proof valve 10 may be composed of the first straight line segment 11, the second straight line segment 12, and the middle segment 13.

In an embodiment, as shown in FIG. 5, the middle segment 13 includes a first segment 133, a second segment 134, and a third segment 135. Two ends of the third segment 135 are respectively connected to the first segment 133 and the second segment 134, and the first segment 133 and the second segment 134 are respectively connected to the first straight line segment 11 and the second straight line segment 12. The first segment 133 and the second segment 134 are circular arc segments, and the third segment 135 is a straight line segment, thus it may be ensured that the first straight line segment 11 and the third segment 135 are transitioned through the circular arc segment, and the second straight line segment 12 and the third segment 135 are transitioned through the circular arc segment. In this way, it is possible to avoid excessive stress concentration, so that the explosion-proof valve 10 may burst open while making the explosion pressure of the explosion-proof valve 10 controllable.

In an embodiment, as shown in FIG. 1 and FIG. 2, the number of the explosion-proof valves 10 is at least two, and the at least two explosion-proof valves 10 are located on the same side of the battery casing 20. Furthermore, the at least two explosion-proof valves 10 are located on the same surface of the battery casing 20. Therefore, the explosion-proof performance of the explosion-proof valve 10 may be improved, and the battery safety problem caused by the failure of one explosion-proof valve 10 to burst open may be avoided. By arranging the at least two explosion-proof valves 10 on the same side of the battery casing 20, it is possible to facilitate controlling the spraying direction of the gas and liquid inside the battery casing 20 after the explosion-proof valve 10 bursts open, thus improving the safety performance of the battery.

In an embodiment, the at least two explosion-proof valves 10 are center-symmetrical about the intersection of the first diagonal direction and the second diagonal direction of the battery casing 20, so that the direction of the battery may be adjusted according to the requirement of serial connection or parallel connection of the batteries in the battery grouping process. The adjustment of the battery direction does not affect that the explosion-proof valve 10 of each battery may be located substantially in the same direction.

It should be noted that the two explosion-proof valves 10 are center-symmetrical about the intersection of the first diagonal direction and the second diagonal direction of the battery casing 20, that is, after one explosion-proof valve 10 rotates the intersection of the first diagonal direction and the second diagonal direction by 180 degrees, the two explosion-proof valves 10 coincide with each other.

In an embodiment, the battery may further include a pole assembly 30 and a cell, the cell may include two tab portions, and the two tab portions may be connected to the two pole assemblies 30 respectively.

In an embodiment, the pole assembly 30 is disposed in the battery casing 20, the battery casing 20 is provided with a recess 24, and the pole assembly 30 is located in the recess 24, so that it is possible to prevent the pole assembly 30 from occupying the stacking space for the battery assembly, thereby improving the energy density of the battery assembly.

In an embodiment, as shown in FIG. 2 and FIG. 3, the battery casing 20 is provided with a recess 24, the pole assembly 30 and the recess 24 are respectively located on two opposite surfaces of the battery casing 20, and the recess 24 is used for receiving a pole assembly of another battery. In this way, when the batteries are grouped, the pole assembly of another battery may be accommodated in the recess 24, thereby avoiding the pole assembly from occupying the space between the two batteries and reducing the distance between the two adjacent batteries, such that the energy density of the battery assembly is increased.

In an embodiment, as shown in FIG. 2 and FIG. 3, there may be two pole assemblies 30 and there may be two recesses 24. The two pole assemblies 30 may be disposed on one first surface 21, and the two recesses 24 may be provided on another first surface 21.

In an embodiment, the length of the battery is L, the equation of 400 mm≤L≤2500 mm is satisfied, the width of the battery is K, and the height of the battery is H, and the equation of 2K≤L≤50K, and/or, 0.5H≤K≤20H are satisfied.

Further, the following is satisfied: 50 mm≤K≤200 mm, and 10 mm≤H≤100 mm.

Preferably, the following is satisfied: 4K≤L≤25K, and/or, 2H≤K≤10H.

In the batteries in the above-mentioned embodiments, the ratio of the length to the width of the battery is relatively large under the condition that sufficient energy density is ensured, and further, the ratio of the width to the height of the battery is relatively large.

In an embodiment, the length of the battery is L, the width of the battery is K, and the equation of 4K≤L≤7K is satisfied, that is, the ratio of the length to the width of the battery in this embodiment is relatively large, so as to increase the energy density of the battery and facilitate subsequent formation of the battery assembly.

In an embodiment, the height of the battery is H, the equation of 3H≤K≤7H is satisfied, the ratio of the width to the height of the battery is relatively large, and it is also convenient to form the battery under the condition that sufficient energy density is ensured.

Optionally, the length of the battery may be 500 mm to 1500 mm, the width of the battery may be 80 mm to 150 mm, and the height of the battery may be 15 mm to 25 mm.

It should be noted that the length of the battery is the dimension in the length direction of the battery, the width of the battery is the dimension in the width direction of the battery, and the height of the battery is the dimension in the height direction of the battery, that is, the thickness of the battery.

In an embodiment, the battery is a laminated battery, which is not only convenient for the battery to be grouped, but also the battery may be processed to have a longer length.

The battery includes a cell and an electrolyte, which is the minimum unit capable of performing electrochemical reactions such as charging/discharging. The cell refers to a unit formed by winding or laminating a stack portion including a first electrode sheet, a separator and a second electrode sheet. When the first electrode sheet is a positive electrode sheet, the second electrode sheet is a negative electrode sheet, and the polarities of the first electrode sheet and the second electrode sheet are interchangeable.

Specifically, the cell is a laminated cell, and the cell has a first electrode sheet that is stacked on each other, a second electrode sheet that is electrically opposite to the first electrode sheet, and a separator sheet disposed between the first electrode sheet and the second electrode sheet, so that multiple pairs of the first electrode sheets and the second electrode sheets are stacked to form a laminated cell.

Optionally, the battery may be a roll core, that is, the first electrode sheet, the second electrode sheet that is electrically opposite to the first electrode sheet, and the separator sheet disposed between the first electrode sheet and the second electrode sheet are wound to obtain a roll core.

An embodiment of the present disclosure also provides a battery assembly including the above-mentioned battery.

The battery of the battery assembly in an embodiment of the present disclosure includes an explosion-proof valve 10 and a battery casing 20. The explosion-proof valve 10 is disposed in the battery casing 20, so that when the internal pressure of the battery casing 20 reaches a preset value, the fragile portion of the explosion-proof valve 10 may be broken through to realize explosion-proof effect. By setting the fragile portion to protrude toward the middle region of the first surface 21, it is possible to control the distance between the first end point 113 and the second end point 123 of the fragile portion and the circumferential edge of the first surface 21, as well as the area jointly enclosed by the connection line between the first end point 113 and the second end point 123 and the fragile portion to ensure that the fragile portion may be broken through when the internal pressure of the battery casing 20 reaches a preset value. In this manner, a reliable explosion-proof effect may be achieved, thereby improving the safety performance of the battery assembly.

In an embodiment, the battery assembly is a battery module or a battery pack.

The battery module includes a plurality of batteries, and the battery module may further include an end plate and a lateral plate, and the end plate and the lateral plate are used for fixing the plurality of batteries.

It should be noted that a plurality of batteries may be formed into a battery module and then arranged in the battery box, and the plurality of batteries may be fixed by the end plate and the lateral plate. Multiple batteries may be directly arranged in the battery box, that is, there is no need to group multiple batteries, and under the circumstances, the end plate and the lateral plate may be removed.

Other embodiments of the disclosure will be apparent to those skilled in the art from consideration of the specification and practice of the disclosure disclosed herein. The disclosure is intended to cover any variations, uses or adaptations of the disclosure. These variations, uses, or adaptations follow the general principles of the disclosure and include common general knowledge or conventional technical means in the art that are not disclosed in the present disclosure. The specification and embodiments are illustrative, and the real scope and spirit of the present disclosure is defined by the appended claims.

It should be understood that the disclosure is not limited to the precise structures that have been described above and shown in the drawings, and various modifications and variations can be made without departing from the scope thereof. The scope of the disclosure is limited only by the appended claims.

What is claimed is:

1. A battery, comprising an explosion-proof valve and a battery casing, wherein the explosion-proof valve is arranged on a first surface of the battery casing, the explosion-proof valve comprises a fragile portion, the fragile portion is able to be broken through, and the fragile portion protrudes toward a middle region of the first surface, the fragile portion comprises a first end point and a second end point, and an area jointly enclosed by a connection line between the first end point and the second end point and the fragile portion between the first end point and the second end point is a, a minimum distance between the first end point and a circumferential edge of the first surface is b, and a minimum distance between the second end point and the circumferential edge of the first surface is c;

wherein $0.8 \leq b/c \leq 1.2$, $b \leq 20$ mm, and $5$ mm$^3 \leq ab \leq 300$ mm$^3$.

2. The battery according to claim 1, wherein $0.9 \leq b/c \leq 1.1$, and/or $b \leq 15$ mm.

3. The battery according to claim 1, wherein $20$ mm$^3 \leq ab \leq 100$ mm$^3$.

4. The battery according to claim 1, wherein the fragile portion comprises a first straight line segment, a second straight line segment and a middle segment, two ends of the middle segment are respectively connected to the first straight line segment and the second straight line segment, one end of the first straight line segment away from the middle segment is the first end point, and one end of the second straight line segment away from the middle segment is the second end point.

5. The battery according to claim 4, wherein the middle segment comprises a curved segment.

6. The battery according to claim 5, wherein the first straight line segment is connected to the curved segment, and/or the second straight line segment is connected to the curved segment.

7. The battery according to claim 4, wherein the battery casing comprises two opposite said first surfaces and four second surfaces arranged around the first surfaces, an area of each first surface is larger than an area of each second surface;

the explosion-proof valve is disposed on a corner region of one of the first surfaces;

wherein at least a part of the middle segment protrudes toward the middle region of the one of the first surfaces.

8. The battery according to claim 7, wherein a circular arc transition segment is formed between adjacent two of the second surfaces, and a vertical distance between the first end point and a corresponding one of the second surfaces is less than 10 mm, a vertical distance between the second end point and another corresponding one of the second surfaces is less than 10 mm, and a vertical distance between the middle segment and the circular arc transition segment is less than 20 mm;

wherein the at least a part of the middle segment protrudes away from the circular arc transition segment adjacent thereto.

9. The battery according to claim 7, wherein the first straight line segment is substantially perpendicular to the second surface adjacent thereto, and the second straight line segment is substantially perpendicular to the second surface adjacent thereto.

10. The battery according to claim 1, wherein the explosion-proof valve and at least a part of the battery casing are an integrally-formed structure.

11. The battery according to claim 1, wherein a number of the explosion-proof valve is at least two, and the at least two explosion-proof valves are located on a same surface of the battery casing;

wherein the at least two explosion-proof valves are center-symmetrical about an intersection of a first diagonal direction and a second diagonal direction of the battery casing.

12. The battery according to claim 1, wherein the battery further comprises a pole assembly, and the pole assembly is disposed on the battery casing;

wherein the battery casing is provided with a recess, the pole assembly is disposed in the recess, or the pole assembly and the recess are respectively located on two opposite surfaces of the battery casing, and the recess is configured to receive a pole assembly of another battery.

* * * * *